May 18, 1948.  H. R. ANSEL  2,441,656
ANTISKID DEVICE
Filed Jan. 13, 1947
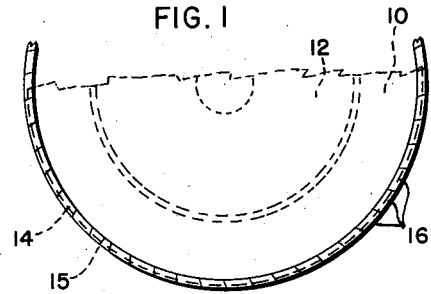
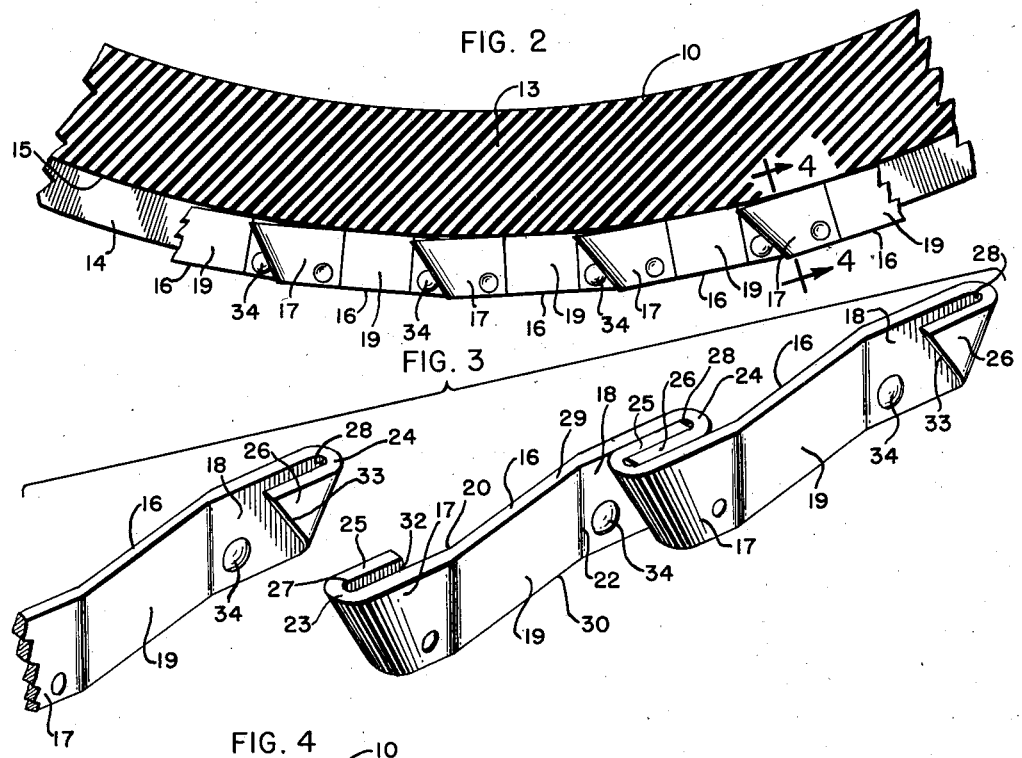
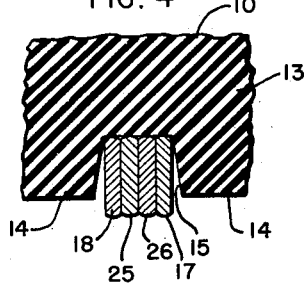
INVENTOR
HARRY R. ANSEL
BY
*Albert G. McCaleb*
ATTORNEY Patented May 18, 1948

2,441,656

UNITED STATES PATENT OFFICE 2,441,656

ANTISKID DEVICE

Harry R. Ansel, Oak Park, Ill.

Application January 13, 1947, Serial No. 721,795

14 Claims. (Cl. 152—239)

This invention relates to antiskid devices, and more particularly to such devices which are adapted to be applied to the tires of vehicles and the like to be left thereon, if desired, as semi-permanent attachments for periods in which there is likelihood of their necessity or desirability.

One of the objects of my invention is to provide an antiskid device for application to vehicle tires and the like which is so constructed and arranged that it may be readily mounted in complementary relationship to the tire tread and used as a semi-permanent attachment adapted to long life, smooth riding qualities and freedom from objectionable noisiness, while presenting an effective metallic antiskid surface.

As another object, my invention comprehends the provision of an antiskid device composed of a series of movably connected link elements which together constitute a closed tire encompassing loop and wherein the construction and relationship of the link elements is such that the tendency of centrifugal force to throw the link elements from the tire is counteracted.

My present invention further contemplates the provision of an antiskid device made up of a series of similar and separately detachable and replaceable link elements.

Another object of the invention resides in the provision of link elements for an antiskid device adapted to furnish effective tractive force in any of a plurality of directions, although having a relatively smooth normal running surface.

For a further object my invention comprehends the provision of a tire encompassing band made up of relatively short link elements movably connected and releasably interlocked together.

As an additional object, the invention contemplates the provision of an antiskid band composed of metallic link elements of a structure and configuration such that they each possess some resilience to longitudinal stress.

Other objects and advantages of the invention will be apparent from the following description and the accompanying drawings in which similar characters of reference indicate similar parts throughout the several views.

Referring to the one sheet of drawings:

Fig. 1 is a fragmentary phantom view in side elevation indicating the application of a preferred form of my antiskid device to a vehicle tire;

Fig. 2 is a fragmentary sectional view drawn to a larger scale than Fig. 1 and also indicating the application of my preferred antiskid device to a vehicle tire or the like;

Fig. 3 is a perspective view showing the structure and manner of interconnecting a plurality of parts of the antiskid device shown in Figs. 1 and 2; and Fig. 4 is a fragmentary sectional view wherein the section is taken substantially on a line 4—4 of Fig. 2 and viewed in the direction indicated by the arrows.

The exemplary embodiment of my invention which is depicted for illustrative purposes in the accompanying drawings not only indicates the structure of a preferred embodiment of my antiskid device, but also indicates a method of applying the device to a vehicle tire 10 or the like which, as indicated in Fig. 1, is mounted in the usual manner upon a wheel 12; the tire and wheel being shown in dot and dash lines. As shown in Figs. 2 and 4, the tire 10 has an outer wall 13 with tread 14 on the road-engaging surface thereof. In the depicted embodiment of my invention, circumferential rows of tread are separated by one or more annular channels 15.

In order to provide an antiskid device adapted to long wear, smooth riding and quiet operation, although left upon the tire as a semi-permenant attachment which is in operative position whenever a need arises for it, I have provided a structure composed of a series of flexibly interconnected link elements 16 which together form a tire-encompassing band adapted to be mounted in one of the annular channels 15 of the tire between the rows of tread 14. By preference, the link elements 16 which compose the entire band are similar in structure and of a size such that they normally project outwardly in a radial direction beyond the wearing surfaces of the tread. The amount of such radial projection is insufficient to cause damage to the wall surface of the tire as a result of the road-carrying force exerted thereon, but is sufficient to provide ample traction on a slippery surface.

Each of the link elements 16 is relatively short so that together they form a polygonal band having so many sides that it conforms very closely to the circular outer surface of the tire. By way of example only, the link elements adapted to use on passenger car tires of the size ordinarily in use at the present time may be about one and one-half inches long.

The preferred structure of each of my link elements which is depicted in the drawings is such that they may be inexpensively formed of strips of sheet metal and hardened to a desired degree for withstanding wear. Each such link element has substantially parallel end portions 17 and 18 connected by an integral mid-portion 19 which is disposed in obtuse angular relationship to both of the end portions; obtuse angular bends 20 and 22 being transverse to the flat side faces of the strip and in reverse directions, so that one of the substantially parallel end portions is offset laterally of the link element from the other. At each end, each link element has a reverse or U-type bend such as 23 and 24 providing reversely disposed portions 25 and 26, respectively, which are spaced from and substantially parallel to the end portions 17 and 18, respectively. Spaces 27 and 28 between the end portions 17 and 18 and their respective reversely disposed portions 25 and 26 are sufficient movably to receive the reversely disposed portions of other similar link elements. In each instance, the reverse bends 23 and 24 are in a direction toward the adjacent obtuse angular bends 20 and 22, respectively.

By preference, each link element 16 has substantially parallel and opposed longitudinal edges 29 and 30; the edges 29 of the assembled links being disposed to face inwardly in a radial direction and engage the outer surfaces of the tire, while the edges 30 face outwardly and provide the road-engaging surfaces.

It is also my preference that the reverse bends 23 and 24 at the ends of the link elements shall be along lines such that the inner end surfaces of the spaces 27 and 28 shall be disposed in acute angular relationship to the inner longitudinal edge 29 of each link element. To provide complementary surfaces on the link elements, end edges 32 and 33 of the reversely disposed portions 25 and 26, respectively, of each link element are disposed in acute angular relationship to the longitudinal edges 30 of the link. In the preferred link structure disclosed, the angles chosen for the disposition of the end edges 32 and 33, as well as the angular disposition of the lines along which the links are reversely bent, are such that the reversely disposed portions 25 and 26 at the opposite ends of the link elements are substantially isosceles triangles with the inner edge 29 of the link providing the bases thereof. With this arrangement of the parts, the inter-engagement or interlocking of the links with one another so that the reversely disposed portions 25 and 26 of each link engage within the spaces 27 and 28 at the ends of adjacent links, effects engagement of the end edges 32 and 33 with the inner end surfaces of the link elements within the spaces 27 and 28. It may be readily understood that with the engaging surfaces thus angularly disposed, any outward movement of one link relative to another in a radial direction caused by centrifugal force or any other cause will tend to shorten the series of links circumferentially so as to counteract such outward movement and hold the band firmly upon its support.

Since the obtuse angular bends 20 and 22 are in reverse directions, a series of connected and similarly disposed links forms a band which is generally disposed in a radial plane; the offsetting of the substantially parallel end portions of each link by the diagonally disposed mid-portion being such that it is compensated for by the overlapping of the end portions and inter-engagement of the reversely disposed portions. Advantages attributable to the oblique disposition of the mid-portions of the links of a series are that they provide tractive force in a circumferential direction, as do the end edges, and also provide for some resilience in the links, which resilience aids in compensating for the flattening of the tire and the conforming movement of the links along the road-engaging portions thereof. The edgewise disposition of the links of a series which encompasses a tire necessarily provides a surface which will dig into and naturally prevent lateral skidding with reference to a slippery surface such as ice.

As an aid in releasably holding the links of a series together, each of the end portions 17 and 18 has an integral protrusion 34 formed therein and projecting outwardly between each of the obtuse angular bends 20 and 22 and the adjacent end edges of the reversely disposed portions 25 and 26. Preferably, the protrusions 34 are smoothly curved and project beyond the surfaces of the end portions sufficiently to engage the reversely disposed portion of an adjoining link when such links are being put together or to resist their disengagement. Manually, the engagement and disengagement of the links may be effected by forcing the end of one link across the protrusion on another. It is also preferred that the protrusions shall be sufficiently spaced from the end edges of the reversely disposed portions of the link to permit movement of one link relative to the other in a radial plane without being bound by or effecting wear upon the adjacent protrusion.

From the foregoing description of the structure and manner of application of my antiskid device to a tire, it may be readily understood that I have provided an antiskid device which may be readily placed upon a tire and which, when so placed, presents a relatively smooth normal running surface which will not be noisy or interfere with the smooth riding qualities of the vehicle. Being made of like link elements, a series may be assembled to fit any desired size of tire and any link element which may become damaged in use may be readily and separately replaced. It is further notable that the conformation of the link elements presents a considerable surface area for contact with the tire surface and provides road-engaging surfaces adapted to furnish tractive force in either circumferential or lateral directions with respect to the tires.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an antiskid device, a link element comprising, in combination, a metal strip of relatively uniform thickness presenting flat faces and having substantially parallel longitudinal edges, said strip having opposite obtuse angular bends in directions lateral to said faces and near its end providing substantially parallel end portions and a mid-portion disposed angularly to the end portions; said strip also having substantially straight opposite end edges disposed in acute angular relationship to one of said longitudinal edges, said end portions being return bent in opposite directions along lines disposed in acute angular relationship to said one of the longitudinal edges to provide reversely disposed portions of generally triangular shape spaced from and substantially parallel to said parallel end portions, each of said return bends being toward the face of the strip which has therein the adjacent obtuse angular bend, and the spacing between said parallel end portions and the respective reversely disposed portions being sufficient to accommodate metal of the thickness of said strip.

2. In an antiskid device, a link element as defined in claim 1, and further characterized by oppositely deformed portions in said substantially parallel end portions providing smoothly curved protrusions on the faces of the strip between said obtuse angle bends and the adjacent edges of said reversely disposed portions.

3. An antiskid device for application to vehicle tires and the like between peripheral rows of tread on the tire and comprising, in combination, a series of link elements as defined in claim 1 interconnected to form a tire-encircling loop having said one of the longitudinal edges of each link element facing inwardly in a radial direction and the other of the longitudinal edges facing outwardly, said link elements being movably interconnected by engagement of the reversely disposed portions of one link element within the spaces between the reversely disposed portions and parallel end portions of the adjacent elements.

4. In an antiskid device, a link element comprising, in combination, a metal strip presenting flat faces and having substantially parallel longitudinal edges, said strip having opposed angular bends in directions lateral to said faces and near its ends providing substantially parallel end portions and a mid-portion disposed angularly to the end portions, said strip also having substantially straight opposite end edges disposed in acute angular relationship to one of said longitudinal edges, said end portions being return bent in opposite directions along lines disposed in acute angular relationship to said one of the longitudinal edges to provide reversely disposed portions of generally isosceles triangular shape with said end edges and said return bends providing the equal sides thereof, said reversely disposed portions being spaced from and substantially parallel to said parallel end portions, and each of said return bends being toward the face of the strip which has therein the adjacent angular bend.

5. In an antiskid device, a link element comprising, in combination, an elongated metal strip presenting longitudinally extending faces and having substantially parallel longitudinal edges, said strip having reverse bends in directions lateral to said faces and near its ends providing end portions disposed in substantially parallel relationship to one another, said strip also having opposite end edges disposed in acute angular relationship to one of said longitudinal edges, said end portions being return bent along lines disposed in acute angular relationship to said one of the longitudinal edges to provide reversely disposed portions of generally isosceles triangular shape with said end edges and said return bends providing the equal sides thereof, said reversely disposed portions being spaced from and substantially parallel to said parallel end portions, and the spacing between said parallel end portions and the respective reversely disposed portions being sufficient to accommodate metal of a thickness of said strip.

6. An antiskid device for application to vehicle tires and the like between peripheral rows of tread on the tire and comprising, in combination, a series of link elements as defined in claim 5 interconnected to form a tire-encircling loop having said one of the longitudinal edges of each link element facing inwardly in a radial direction and the other of the longitudinal edges facing outwardly, said link elements being movably interconnected by engagement of the reversely disposed portions of one link element within the spaces between the reversely disposed portions and parallel end portions of the adjacent elements.

7. In an antiskid device, a link element comprising, in combination, an elongated metal strip having opposed faces and substantially parallel longitudinal edges, said strip having reverse bends in the mid-portion thereof and substantially parallel end portions, said strip also having end edges disposed in acute angular relationship to one of said longitudinal edges, and said end portions being return bent along lines disposed in acute angular relationship to one of the longitudinal edges to provide reversely disposed portions of generally triangular shape spaced from and substantially parallel to said parallel end portions.

8. In an antiskid device, a link element as defined in claim 7 and wherein said parallel end portions each include a protrusion on one face thereof near the adjacent end edge of the reversely disposed portion.

9. An antiskid device for application to vehicle tires and the like between peripheral rows of tread on the tire and comprising, in combination, a series of link elements as defined in claim 7 interconnected to form a tire-encircling loop having one of the longitudinal edges of each link element facing inwardly in a radial direction and the other of the longitudinal edges facing outwardly.

10. An antiskid device for application to vehicle tires and the like comprising, in combination, a series of similarly constructed link elements having substantially parallel end portions and a mid-portion disposed diagonally with respect to the end portions, said link elements having hook portions at their opposite ends, said hook portions of adjacent link elements of the series being interlocked together to connect the link elements into a tire-encircling band, and said hook portions having engaging surfaces so disposed angularly with respect to radii of the band that radial outward movement of any one link element relative to an adjacent link element also effects circumferential movement reducing the circumference of the band.

11. An antiskid device for application to vehicle tires and the like comprising, in combination, a series of similarly constructed link elements having substantially parallel end portions and a mid-portion disposed diagonally with respect to the end portions, said link elements having hook portions at their opposite ends, said hook portions of adjacent link elements of the series being interlocked together to connect the link elements into a tire-encircling band, and said hook portions being so disposed relative to the link elements that said band is radially flexible.

12. In an antiskid device, a link element comprising, in combination, an elongated metal strip having opposed faces and substantially parallel longitudinal edges, substantially parallel end portions, said strip also having substantialy parallel end portions and end edges disposed in acute angular relationship to one of said longitudinal edges, and said end portions being return bent along lines disposed in acute angular relationship to one of the longitudinal edges to provide reversely disposed portions of generally triangular shape spaced from and substantially parallel to said parallel end portions.

13. An antiskid device for application to vehicle tires and the like comprising, in combination, a series of similarly constructed link elements having substantially parallel end portions, said link elements having hook portions at their opposite ends, said hook portions of adjacent link elements of the series being interlocked together to connect the link elements into a tire-encircling band, and said hook portions having engaging surfaces so disposed with respect to radii of the band that radial outward movement of any one link element relative to an adjacent link element also effects circumferential movements reducing the circumference of the band.

14. An antiskid device for application to vehicle tires and the like comprising, in combination, a circumferential band made up of a series of interlocking links, said links being detachable one from another by approximately radial relative movement of adjacent links when the circumferential length of said band is not restrained from decreasing, and said links being non-detachable when the circumferential length of said band is restrained from decreasing.

HARRY R. ANSEL.